US006611400B1

(12) United States Patent
Polycarpou et al.

(10) Patent No.: US 6,611,400 B1
(45) Date of Patent: Aug. 26, 2003

(54) TEXTURE STRUCTURE FOR OPTIMIZING HEAD DISC INTERFACE

(75) Inventors: Andreas A. Polycarpou, Champaign, IL (US); Zine-Eddine Boutaghou, Vadnais Heights, MN (US); Daniel P. Burbank, Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/489,882

(22) Filed: Jan. 21, 2000

Related U.S. Application Data

(60) Provisional application No. 60/116,762, filed on Jan. 22, 1999.

(51) Int. Cl.[7] .......................... G11B 5/60; G11B 17/32; G11B 21/21; G11B 5/82

(52) U.S. Cl. ............................... 360/236.6; 360/237.1; 360/135

(58) Field of Search .......................... 360/236.6, 237.1, 360/235.8, 135

(56) References Cited

U.S. PATENT DOCUMENTS

| | | | | |
|---|---|---|---|---|
| 5,010,429 A | * | 4/1991 | Taguchi et al. | 360/236.6 |
| 5,062,021 A | | 10/1991 | Ranjan et al. | 360/135 |

(List continued on next page.)

FOREIGN PATENT DOCUMENTS

| | | | | | |
|---|---|---|---|---|---|
| JP | 54080728 A | * | 6/1979 | G11B/5/60 |
| JP | 56107363 | | 8/1981 | |
| JP | 63037874 A | * | 2/1988 | G11B/21/21 |
| JP | 01192014 A | * | 8/1989 | G11B/5/704 |
| JP | 03252922 A | * | 11/1991 | G11B/5/82 |
| JP | 6-44717 A | * | 2/1994 | |
| JP | 08069674 | | 3/1996 | |
| JP | 08212740 | | 8/1996 | |
| JP | 08287440 | | 11/1996 | |
| JP | 08293111 A | * | 11/1996 | G11B/5/60 |
| JP | 09219077 A | * | 8/1997 | G11B/21/21 |
| JP | 10177715 A | * | 6/1998 | G11B/5/82 |
| WO | WO 9707503 A1 | * | 2/1997 | G11B/5/66 |

OTHER PUBLICATIONS

"Static Friction of Contacting Real Surfaces in the Presence of Sub–Boundary Lubrication" by A.A. Polycarpou et al., *Journal of Tribology*, vol. 120, Apr. 1998.

Surface roughness analysis of glass–ceramic substrates and finished magnetic disks, and Ni–P coated Al–Mg and glass substrates: Chin Poon et al., *Wear*, vol. 190, No. 1, Nov. 1995.

"Patterned Media: 200 Gb/in2 or bust" by Caroline Ross et al., *Data Storage*, Sep. 1998.

*Primary Examiner*—William Klimowicz
(74) *Attorney, Agent, or Firm*—Westman, Champlin & Kelly, P.A.

(57) ABSTRACT

A head disc interface having a fine pitch surface roughness including fine pitch projections having a relatively smooth roughness height and a projection pitch <1.0 $\mu$m for optimizing tribological performance.

16 Claims, 20 Drawing Sheets

U.S. PATENT DOCUMENTS

| | | | | | |
|---|---|---|---|---|---|
| 5,067,037 | A | | 11/1991 | Ananth et al. | 360/103 |
| 5,079,657 | A | * | 1/1992 | Aronoff et al. | 360/236.6 |
| 5,082,709 | A | * | 1/1992 | Suzuki et al. | 428/141 |
| 5,200,867 | A | | 4/1993 | Albrecht et al. | 360/103 |
| 5,202,803 | A | | 4/1993 | Albrecht et al. | 360/97.02 |
| 5,267,104 | A | | 11/1993 | Albrecht et al. | 360/97.02 |
| 5,345,353 | A | | 9/1994 | Krantz et al. | 360/103 |
| 5,418,667 | A | | 5/1995 | Best et al. | 360/103 |
| 5,424,888 | A | | 6/1995 | Hendriks et al. | 360/103 |
| 5,446,606 | A | | 8/1995 | Brunner et al. | 360/75 |
| 5,482,497 | A | | 1/1996 | Gonnella et al. | 451/57 |
| 5,499,149 | A | | 3/1996 | Dovek | 360/103 |
| 5,499,731 | A | | 3/1996 | Marshall | 216/22 |
| 5,508,077 | A | | 4/1996 | Chen et al. | 428/64.3 |
| 5,537,273 | A | | 7/1996 | Hendriks et al. | 360/103 |
| 5,550,691 | A | | 8/1996 | Hamiton | 360/103 |
| 5,550,693 | A | | 8/1996 | Hendriks et al. | 360/103 |
| 5,550,696 | A | | 8/1996 | Nguyen | 360/135 |
| 5,572,386 | A | | 11/1996 | Ananth et al. | 360/103 |
| 5,586,040 | A | | 12/1996 | Baumgart et al. | 364/474.08 |
| 5,625,512 | A | | 4/1997 | Smith | 360/103 |
| 5,626,941 | A | | 5/1997 | Ouano | 428/141 |
| 5,635,269 | A | | 6/1997 | Weir et al. | 428/65.3 |
| 5,673,156 | A | * | 9/1997 | Chen et al. | 360/236.6 |
| 5,726,831 | A | | 3/1998 | White | 360/103 |
| 5,742,518 | A | * | 4/1998 | Gui et al. | 702/42 |
| 5,768,055 | A | | 6/1998 | Tian et al. | 360/103 |
| 5,773,124 | A | * | 6/1998 | Ishikawa et al. | 204/192.16 |
| 5,774,303 | A | * | 6/1998 | Teng et al. | 360/235.2 |
| 5,815,346 | A | * | 9/1998 | Kimmal et al. | 360/236.6 |
| 5,841,608 | A | | 11/1998 | Kasamatsu et al. | 360/103 |
| 5,871,621 | A | * | 2/1999 | Ross | 204/192.16 |
| 5,875,084 | A | * | 2/1999 | Baumgart et al. | 360/135 |
| 5,912,791 | A | | 6/1999 | Sundaram et al. | 360/135 |

* cited by examiner

| | Rough | Smooth Surface | Fine Pitch Micro Roughness |
|---|---|---|---|
| $\sigma$ | HIGH | LOW | LOW |
| R | LOW | HIGH | LOW |
| $\frac{\sigma}{R}$ | $\frac{\text{HIGH}}{\text{LOW}}$ | $\frac{\text{LOW}}{\text{HIGH}}$ | $\frac{\text{LOW}}{\text{LOW}}$ |
| Plasticity Index $\psi$ | HIGH | LOW | INTERMEDIATE |
| Adheision Index $\theta$ | HIGH LOWER ADHESION | LOW | INTERMEDIATE |
| Friction | LOW | HIGH | INTERMEDIATE |
| WEAR | HIGH | LOW | LOW |

FIG. 7

| | Rough (120) | Smooth Surface (130) | Fine Pitch Micro Roughness (140) |
|---|---|---|---|
| $\sigma$ | 2nm | 0.2nm | .2nm |
| R (pitch) | 10–20$\mu$m | 100–200$\mu$m | R≈1–5$\mu$m |
| $\left(\frac{\sigma}{R}\right) \times 10^{-3}$ | .133 | .0013 | .04 |

FIG. 12

| σ(Å) | R (μm) | d μm | 4A (Å) | η (μm⁻²) | ψ |
|---|---|---|---|---|---|
| 5.0 | 1 | 0.17 | | 35.8 | 0.89 |
| | 2 | 0.24 | 28.3 | 17.9 | 0.63 |
| | 5 | 0.37 | | 7.3 | 0.40 |
| | 10 | .053 | | 3.6 | 0.28 |
| .133 | 1 | 0.11 | | 89.5 | 0.57 |
| | 2 | 0.15 | 11.3 | 44.8 | 0.40 |
| | 5 | 0.24 | | 17.9 | 0.25 |
| | 10 | .033 | | 8.9 | 0.18 |

(a)

(b)

(c)

(d)

(e)

(f)

(g)

TEXTURE STRUCTURE FOR OPTIMIZING HEAD DISC INTERFACE

CROSS-REFERENCE TO RELATED APPLICATION

This application claims priority to Provisional Application Ser. No. 60/116,762 filed Jan. 22, 1999, and entitled "OPTIMIZED SURFACE ROUGHNESS FOR IMPROVED TRIBOLOGICAL PERFORMANCE."

BACKGROUND OF THE INVENTION

The present invention relates to a data storage system. In particular, the present invention relates to a tribological surface structure for head disc interface.

Disc drives are well known in the industry. Such drives use rigid discs coated with a magnetizable medium for storage of digital information in a plurality of concentric data tracks. Typically, disc drives include a disc pack including a plurality of concentric discs mounted on a spindle motor which causes the discs to spin. Heads (or slider) carrying transducer elements are supported relative to the disc surfaces to read and or write digital information to the disc surfaces.

During or prior to operation the head contacts the disc surface. For proximity recording the head contacts the disc surface for contacts starts and stops ("CSS"), and for contact recording the slider or head is dragged across the disc surface for read and write operations. Stiction or friction between contacting interface surfaces of the head and disc is proportional to the normal force on the head, the bearing area and the interfacial material properties of the head and disc interface surfaces: including the combined Modulus of Elasticity, the hardness of the materials, the nominal area of contact, the lubricant properties and surface roughness of the head disc interface surfaces.

For CSS operations, the spindle motor produces torque to overcome stiction and initiate "spin-up". Stiction increases the motor torque required to spin-up the disc drive. If stiction is too large for motor torque to overcome, spin-up failure could occur. High friction and stiction increases power requirements for spin up and operating power requirements for contact or near contact recording. Contact pads or pad assisted landing on CSS heads reduces contact area to reduce stiction. Roughened head-disc interface surfaces reduces stiction and friction. Contact pads and roughened surface structures can increase the spacing required between the head and disc surface or can increase head-disc contact and data loss and damage to the disc drive. The present invention addresses these and other problems.

SUMMARY OF THE INVENTION

The present invention relates to a head disc interface having a fine pitch surface roughness including fine pitch projections having a relatively smooth roughness height and a projection pitch <1.0 $\mu$m for optimizing tribological performance.

BRIEF DESCRIPTION OF THE DRAWINGS

FIG. 5 is a chart illustrating characteristics for a rough surface structure, smooth surface structure and a fine pitch surface roughness having a relatively low roughness height.

FIG. 7 is a chart illustrating example parameters for comparing a rough surface structure, smooth surface structure and a fine pitch roughness structure having a relatively low roughness height of FIGS. 3–4 and 6.

FIG. 12 is a chart illustrating characteristics for various roughness parameters.

FIGS. 14-1 through 14-7 illustrate various deterministic projection topographies for a fine pitch roughness structure.

DETAILED DESCRIPTION OF THE ILLUSTRATIVE EMBODIMENTS

Figure 1:
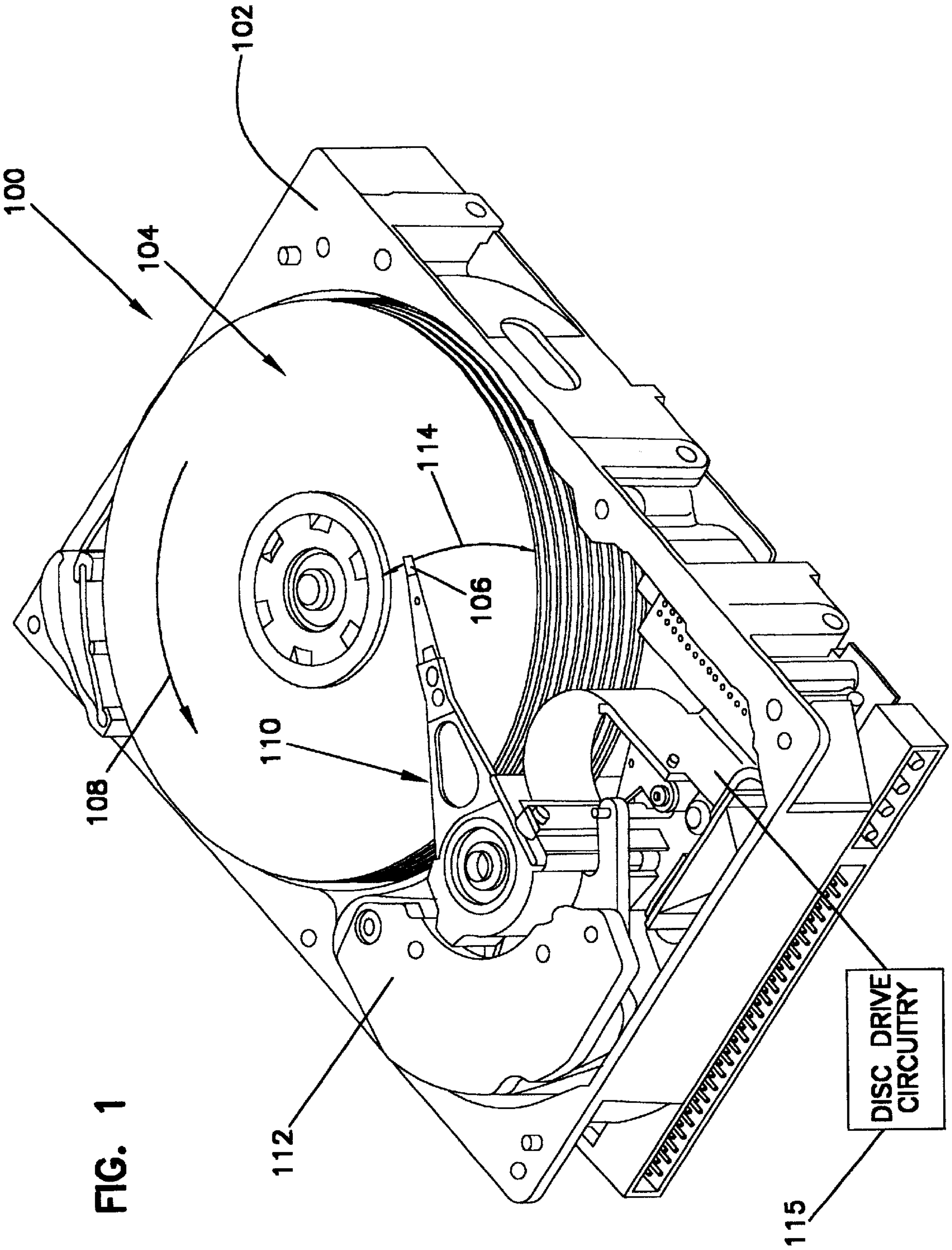
FIG. 1 is a perspective illustration of a disc drive.

FIG. 1. illustrates a disc drive 100 including a chassis 102, discs 104, and heads 106. Discs 104 are rotationally coupled to chassis 102 via a spindle motor (not shown) for rotation, as illustrated by arrow 108. Discs 104 are fabricated to store digital information. Heads 106 are supported by an actuator or E-block 110 for reading and/or writing data to and from discs 104. The actuator or E-block 110 is coupled to a voice coil motor (VCM) 112 to rotate the E-block 110 as illustrated by arrow 114 to move heads 106 along an arcuate path for placement relative to data tracks of a disc for read or write operations. Movement of the actuator block 110 by voice coil motor 112 is controlled by drive circuitry illustrated by block 115.

Heads 106 include transducer elements, such as inductive type transducers, magnetoresistive, or magneto-optical transducers for read and write operations. As shown diagrammatically in FIG. 2, head 106 includes an head interface surface 116 (shown diagrammatically) which faces a disc interface surface 118. Depending upon operation of the disc drive, head interface surface 116 interfaces with or contacts the disc surface 118. For example, for CSS, heads 106 are parked on the disc surface 118 so that surface 116 is in direct contact with the disc surface 118. For contact or near contact recording the head 106 is dragged across the disc surface so that the interface surfaces 116, 118 of the head and disc contact.

Figure 3:
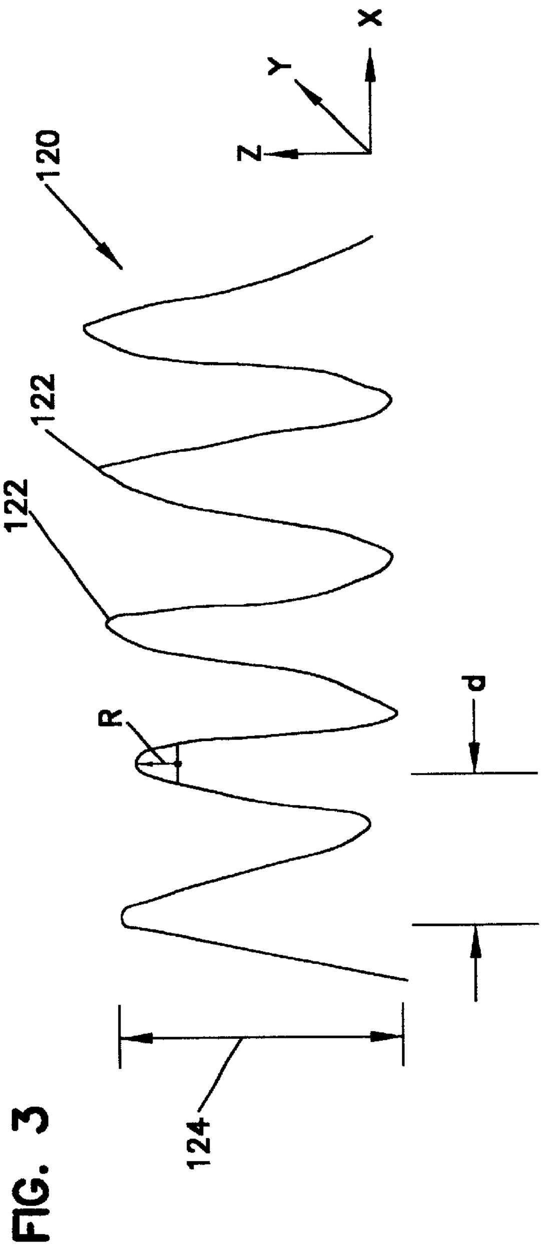
FIG. 3 is a schematic illustration of a rough surface structure having a relatively high roughness height.

Friction and stiction develops between contacting or near contact interface surfaces. Friction and stiction between the head-disc interface surfaces 116, 118 increases power requirements for operation. To reduce friction/stiction, prior interface surfaces 116 or 118 include a roughened surface structure 120 as illustrated in FIG. 3. The roughened surface structure 120 includes a plurality of projections or asperities 122 having a projection height 124 or roughness height. Roughened surface structure 120 provides stiction control, however, the height of projections or asperities 122 can increase the fly height between head 106 and disc 104. Roughened surface structures 120 can be formed of random or deterministic projections or is roughness. The projection height 124 for a roughened surface structure is related to A—is the amplitude A of projections for a deterministic pattern;

$R_a$—is the center line average projection height 124 or z-axis dimension for random textured surfaces; and σ—is the root mean square of the surface heights of the projections 122.

Other roughened surface characteristics include

R—is the average value of the radius of curvature of asperity summits, as shown; and d—is the average pitch or distance between asperity summits;

η—is a measure of the density of the asperities or projections and $\eta=1/d^2$.

Figure 4:
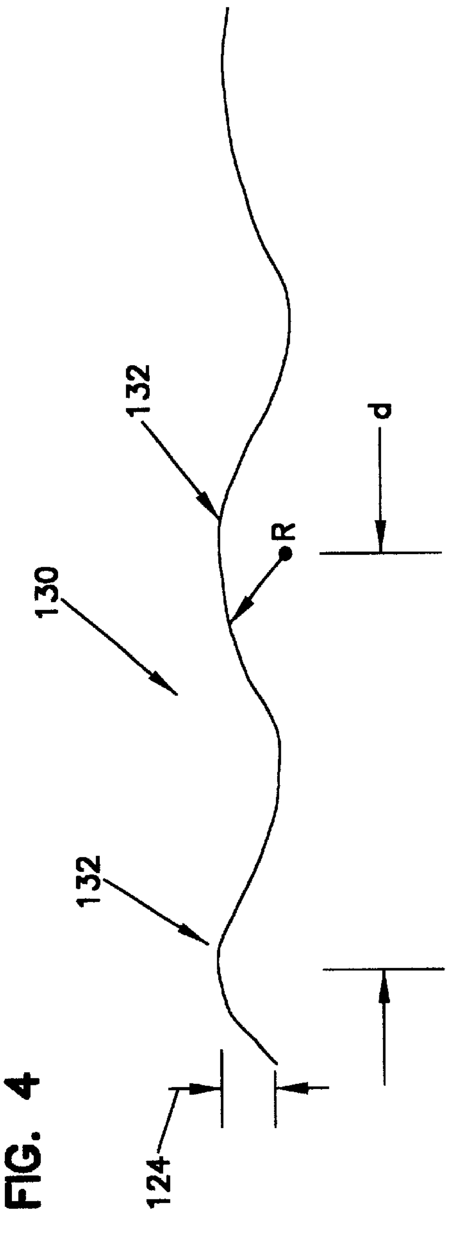
FIG. 4 is a schematic illustration of a smooth surface structure having a relatively low roughness height.

Roughened surface structure 120 is characterized by a relatively high projection height and σ, and a relatively low. R and d and provides stiction control. However, as previously mentioned, the height of projections or asperities 122 can increase the fly height between the head 106 and disc 104. Smoother surface structures 130 as illustrated in FIG. 4 have a wavy surface structure or projections 132 characterized by a lower projection height, and σ and a relatively high R and d. The lower projection height reduces the gap between transducer elements (read-write elements) and the disc surface between the head and disc, but the smoother structure compromises stiction control.

Stiction control attributes for a surface structure are related to the plasticity and adhesion indexes of the surface structure. The plasticity index is calculated as follows:

$$\psi = \frac{E}{H}\left[\frac{\sigma}{R}\right]^{1/2}$$

where:

E—is the combined Young's Modulus of Elasticity for the interface surfaces; and

H—is the hardness of the softer interface material.

The plasticity index Ψ is a measure of the plasticity or elasticity of the contacting asperities or projections. A lower plasticity index indicates elastic deformations and high friction due to adhesion of the contacting asperities and a high plasticity index indicates plastic deformations and low friction and high wear for the contacting asperities.

The adhesion index θ is calculated as follows:

$$\theta = E\frac{\sigma}{\Delta\gamma}\left[\frac{\sigma}{R}\right]^{1/2}$$

where:

Δγ—is the energy of adhesion, related to the surface free energy of the contacting asperities.

The lower the adhesion index θ the more important, adhesion forces become and thus friction increases. A higher adhesion index θ provides lower adhesion and stiction. The plasticity Ψ and adhesions θ indexes are calculated based upon σ/R so a lower σ/R ratio provides a high friction surface structure with a low plasticity and a low adhesion index and a higher σ/R ratio provides a low friction surface structure with a high plasticity index and a high adhesion index.

Figures 1, 14:
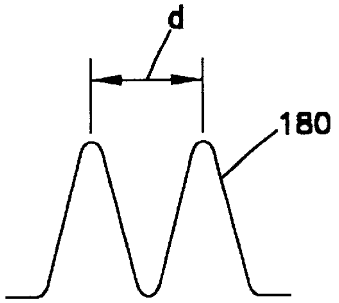
Figures 2, 14:
Figures 3, 14:
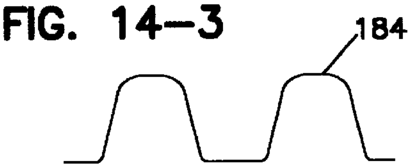
Figures 4, 14:
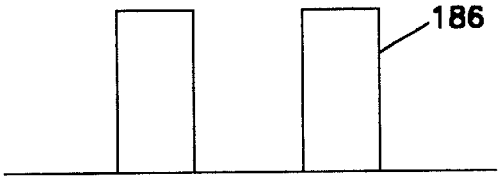
Figures 5, 14:
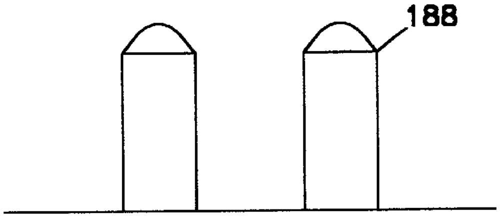
Figures 6, 14:
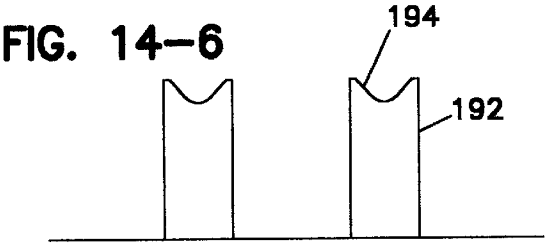

FIG. 5 summarizes σ, R, σ/R, Ψ and θ for a rough surface structure 120 and a smooth surface structure 130. For the rough surface structure 120, since projection height is high (A or $R_a$ is large), σ of the projections 122 is relatively high and the R of the projections is low, thus the σ/R ratio is high for a relatively high adhesion index θ and plasticity index Ψ for low friction. Although rough surface structure 120 has low friction, the rough surface structure has high wear and a high projection height which limits reductions in head-disc spacing. For a smooth surface structure, since projection height is relatively low, (A or $R_a$ is small) σ is low and the R of the projections is high and thus the σ/R ratio, plasticity index Ψ and adhesion index θ are relatively low. Thus, although the low projection height of the smooth surface structure 130, reduces head-disc spacing limitations and wear, the low σ and high R of the interface surface produces unacceptably high friction.

Figure 6:
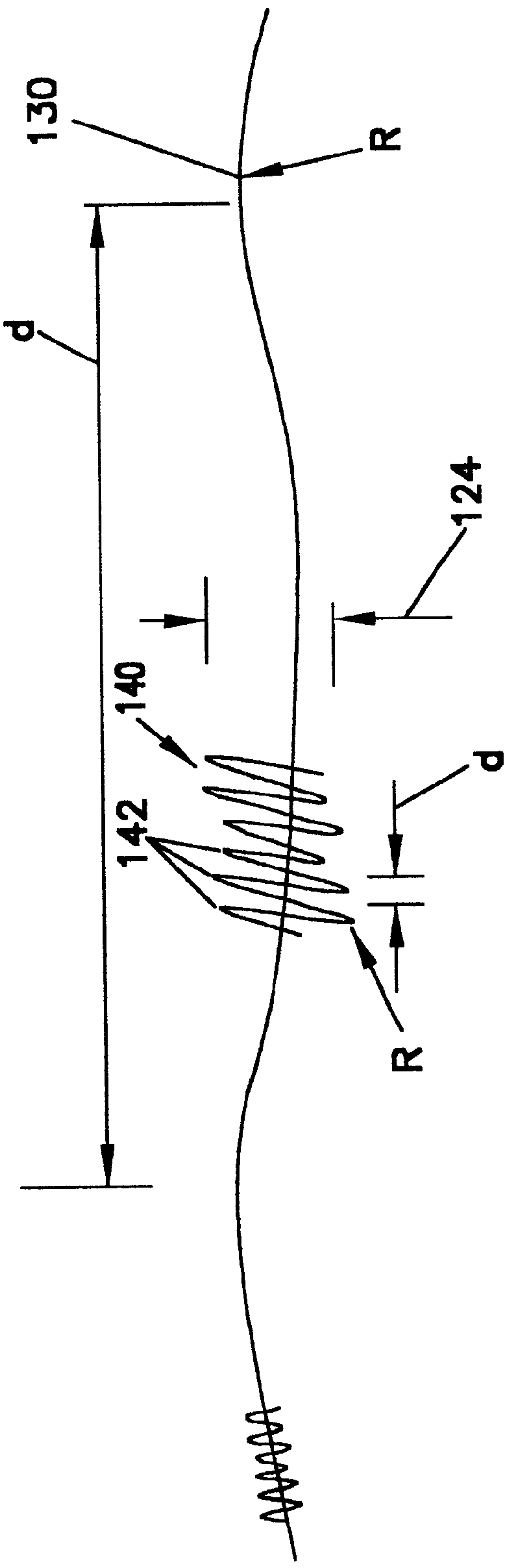
FIG. 6 is a schematic illustration of an embodiment of a fine pitch surface roughness having a relatively low roughness height of the present invention.

The present invention relates to a fine pitch roughness structure 140 as illustrated in FIG. 6 for limiting interface friction by reducing the radius of curvature R of the asperities or projections while maintaining a low projection height σ to limit fly height interference and reduce the gap between the transducer elements and the disc surface. In the embodiment shown in FIG. 6, the surface structure 140 is fabricated on a smooth surface structure 130 and includes a plurality of fine pitch projections 142 having a relatively low projection height of the order of magnitude of the smooth surface structure 130 and a low R in contrast to the high R for a typical smooth surface structure 130. As illustrated in FIG. 5, the low σ and R provides an intermediate σ/R ratio in comparison to the rough surface structure 120 and the smooth surface structure 130 to provide an intermediate plasticity Ψ and adhesion index θ for acceptable friction with projections having a low projection height for reduced fly height and head-disc spacing.

Figures 7, 14:
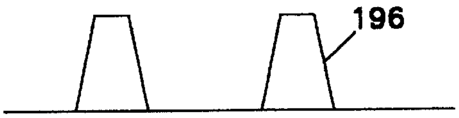

FIG. 7 illustrates example parameters for an embodiment of a fine pitch micro roughness structure 140. In an example embodiment, the high pitch structure 140 includes a $R_a \approx 0.2$ nm and σ≈0.2 nm, a pitch d≈0.2 μm and R≈1–5 μm. Thus, as shown, the fine pitch structure 140 includes a low projection height or $R_a$ with an order of magnitude σ/R ratio, plasticity and adhesion index increase and thus, an order of magnitude friction decrease over the smooth surface structure 130 with no measurable wear. Example parameter ranges for the fine pitch surface structure 140 include $R_a \approx 0.1$–0.5 nm, σ≈0.2–0.6 nm, R≈1–5 μm and pitch d≈0.1–0.8 μm.

Figure 8:
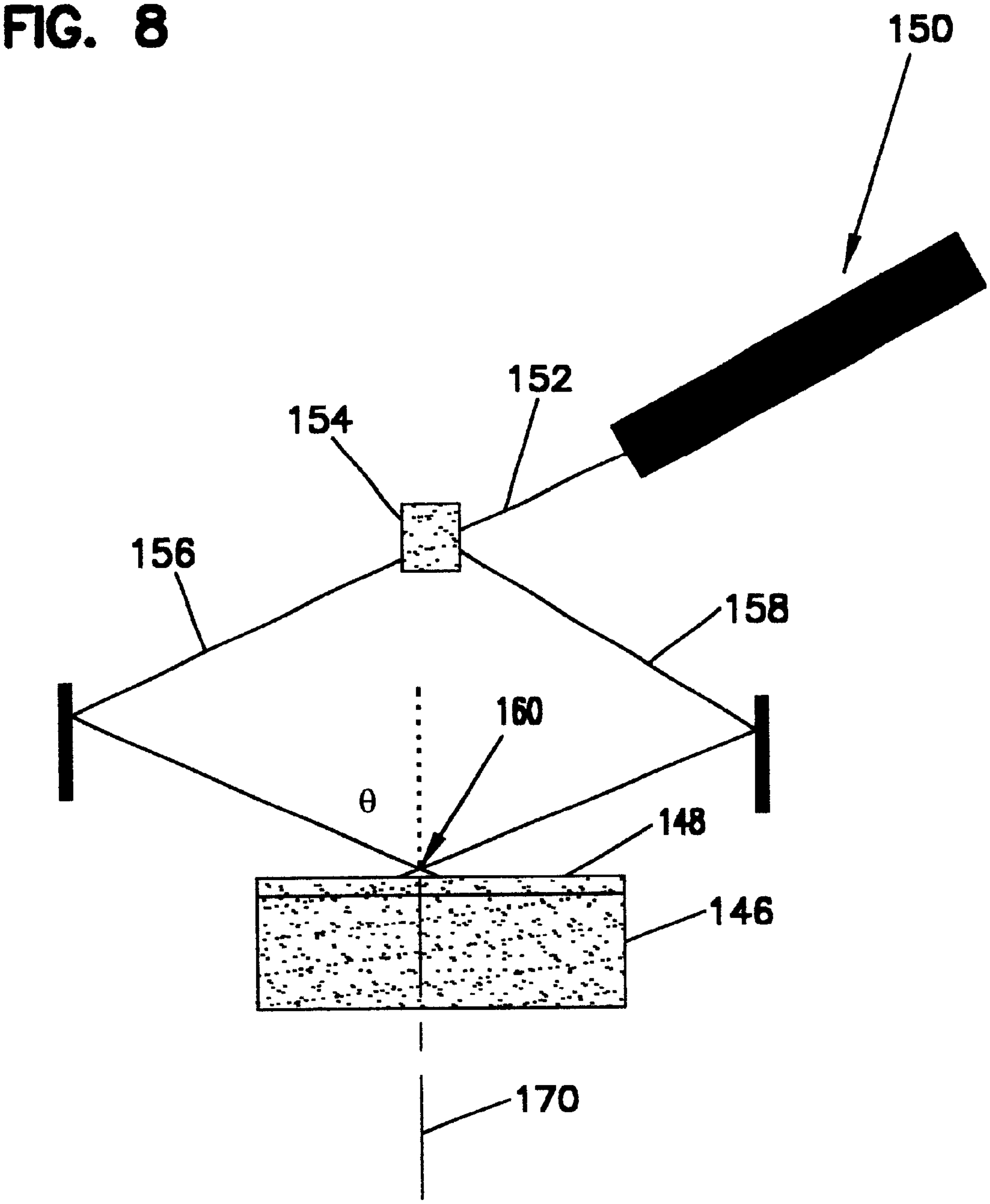
FIG. 8 is a schematic illustration of an interference lithography process for forming a fine pitch rough surface structure.

One embodiment for fabricating the fine pitch structure 140 is illustrated in FIG. 8 and includes the steps of lapping or polishing a substrate surface 146 to provide a relatively smooth surface finish. The fine pitch roughness structure 140 is formed on the smooth surface using interference lithography. The substrate surface is coated with a photoresist layer 148 sensitive to ultraviolet UV radiation. The thickness of the photoresist layer 148 should be thin to produce a micronano roughness having a relatively low projection height. As shown diagrammatically in FIG. 8, a UV laser source 150 emits a laser beam 152 which is split by beam splitter 154 to form beams 156, 158. Beams 156, 158 are focused to form an interfering pattern 160 which forms the fine pitch pattern. The resist is exposed and developed and the exposed surface is etched, for example, by an ion milling process to form the fine pitch pattern 140.

Figure 9:
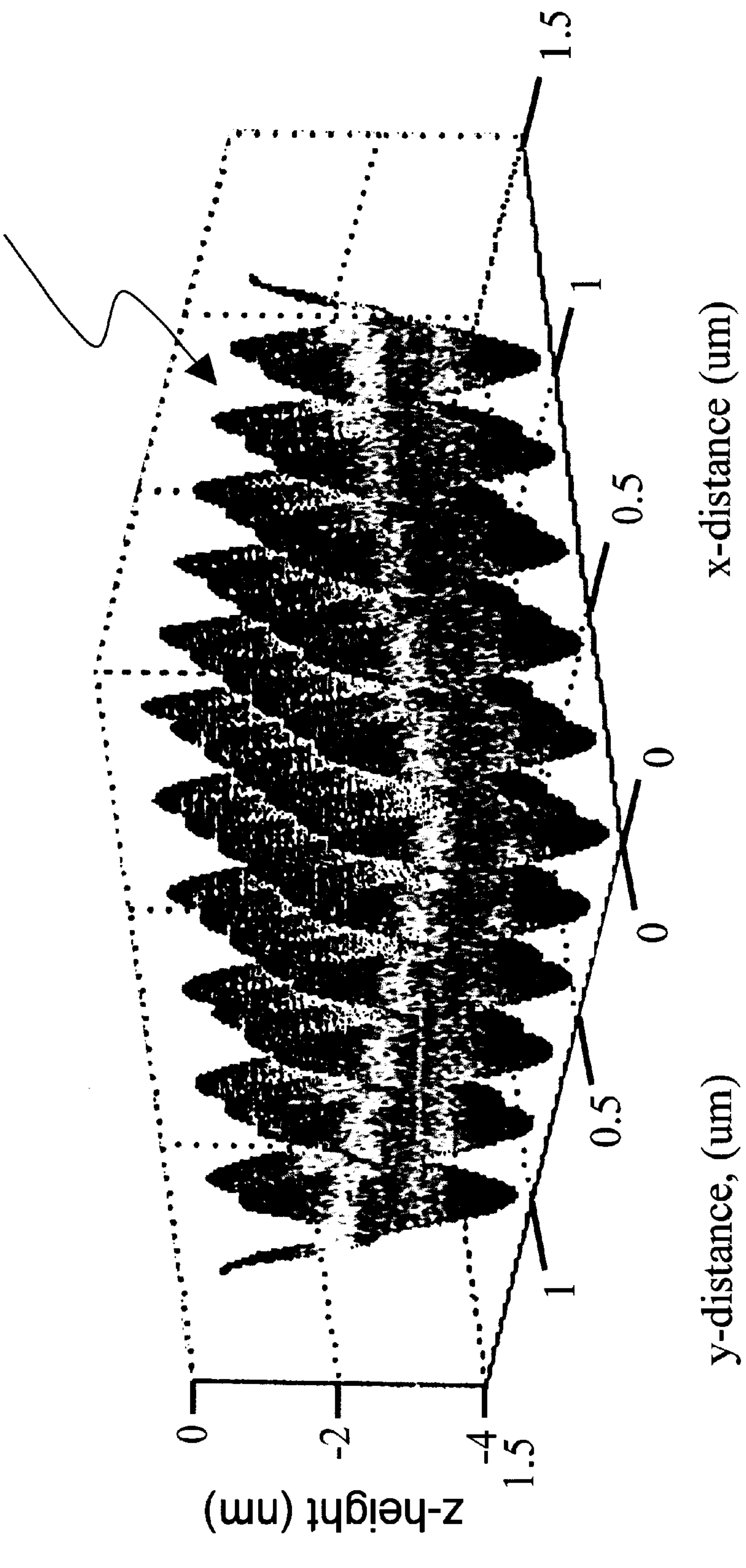
FIGS. 9–11 illustrate various fine pitch roughness patterns.
Figure 10:
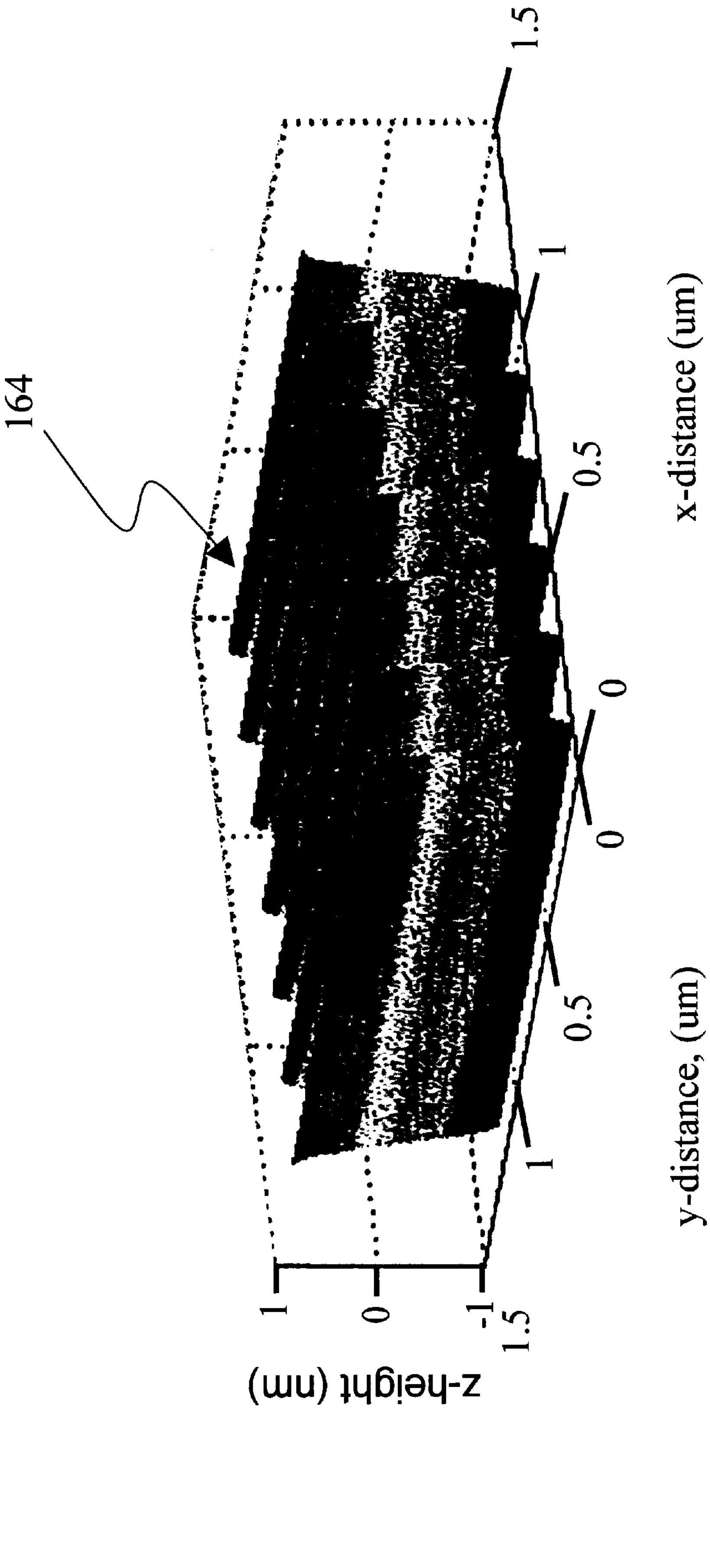
Figure 11:
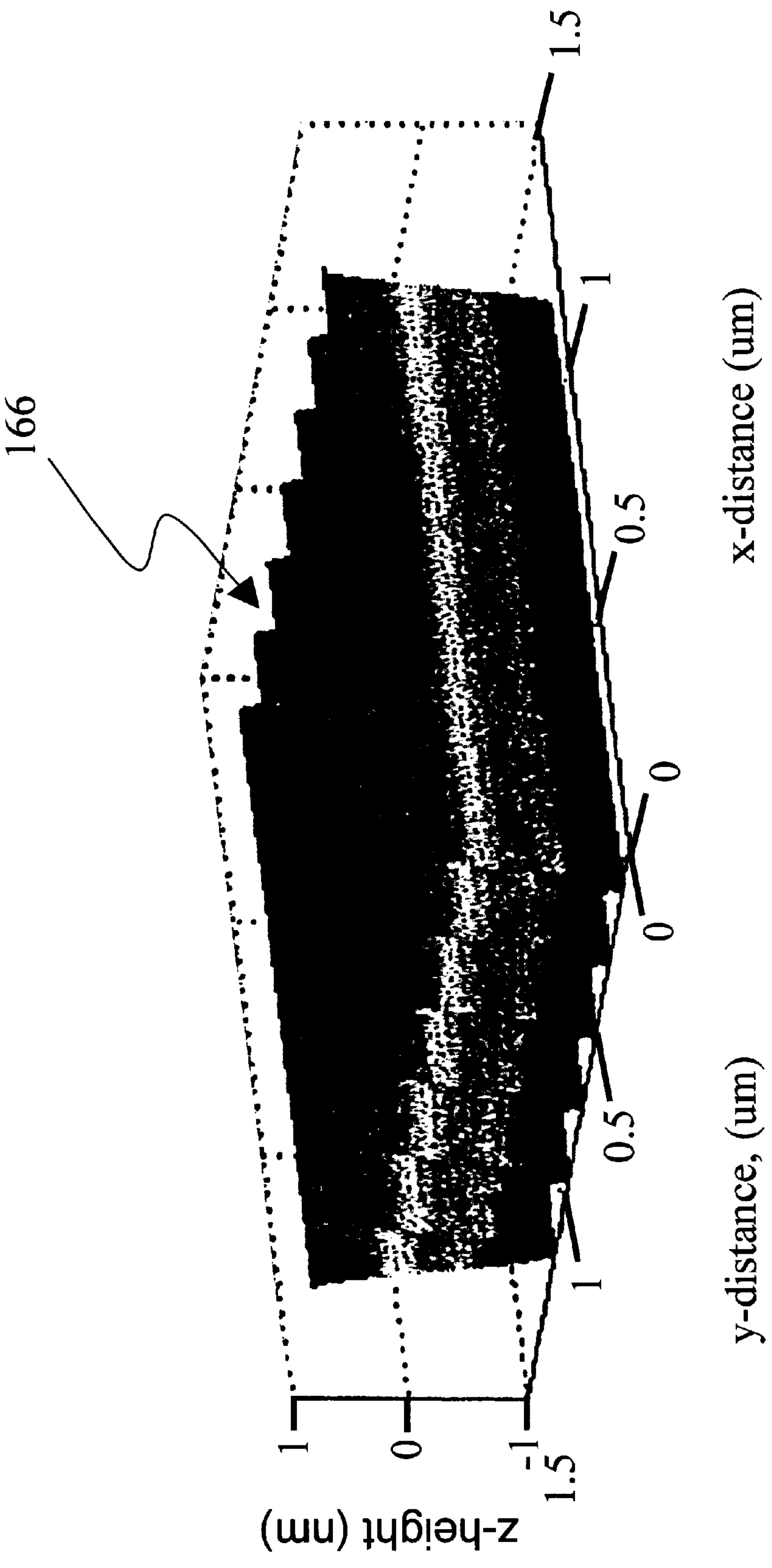

The relatively fine pitch roughness surface 140 having a relatively low roughness surface height (or projection height) can be fabricated in different patterns on the interface surface. As previously, discussed, the different fabricated patterns can have a general deterministic shape or pattern or a random shape or pattern. Deterministic patterns will contain some random variations but exhibit a general deterministic pattern. Deterministic patterns include a sinusoidal pattern 162 as illustrated in FIG. 9, which provides an advantage for easy stress analysis, and longitudinal and transverse wave patterns 164, 166 as illustrated in FIGS. 10–11, respectively. The area of contact between longitudinal and transverse surfaces and a nominally flat surface is that of a line contact and may offer advantages of reduced stresses.

As previously explained, sinusoidal pattern 162 provides a deterministic pattern for easy stress analysis. The sinusoidal pattern 162 is fabricated using interference lithography by exposing photoresist layer 148 in a first orientation by beams 156, 158 and rotating the substrate 90° relative to axis 170 as shown in FIG. 8 and exposing the photoresist layer 148 in a second direction to form the two dimensional sinusoidal pattern.

The parameters of the fine pitch surface structure 162 (projection height, pitch, σ, R) can be designed for optimum stiction control and for optimum wear. Wear is related to or proportional to the contact interface area. Different pitch and amplitude parameters provide varied areas of contact. For a sinusoidal pattern 162.

$$\sigma \approx \sqrt{2A}$$

$$R = \frac{d^2}{4\pi^2 A}$$

where: A—is the amplitude of the projections d—is the pitch of the projections.

Thus, the amplitude and pitch d can be designed, as previously explained, to optimize head-disc separation, stiction, contact stress and wear. Thus, for optimization of the parameters for a sinusoidal pattern, amplitude A and pitch d are designed to control σ/R for a high adhesion index and plasticity index for low friction and a low amplitude A or σ for reduced head disc spacing and R is designed for distributing contact stress based upon.

$$\theta \approx fn\left(\sqrt{\sigma / R}\right),$$

$$\psi \approx fn\left(\sqrt{\sigma / R}\right),$$

$$\sigma \approx \sqrt{2A}$$

$$R \approx \frac{d^2}{4\pi^2 A}.$$

Figure 13:
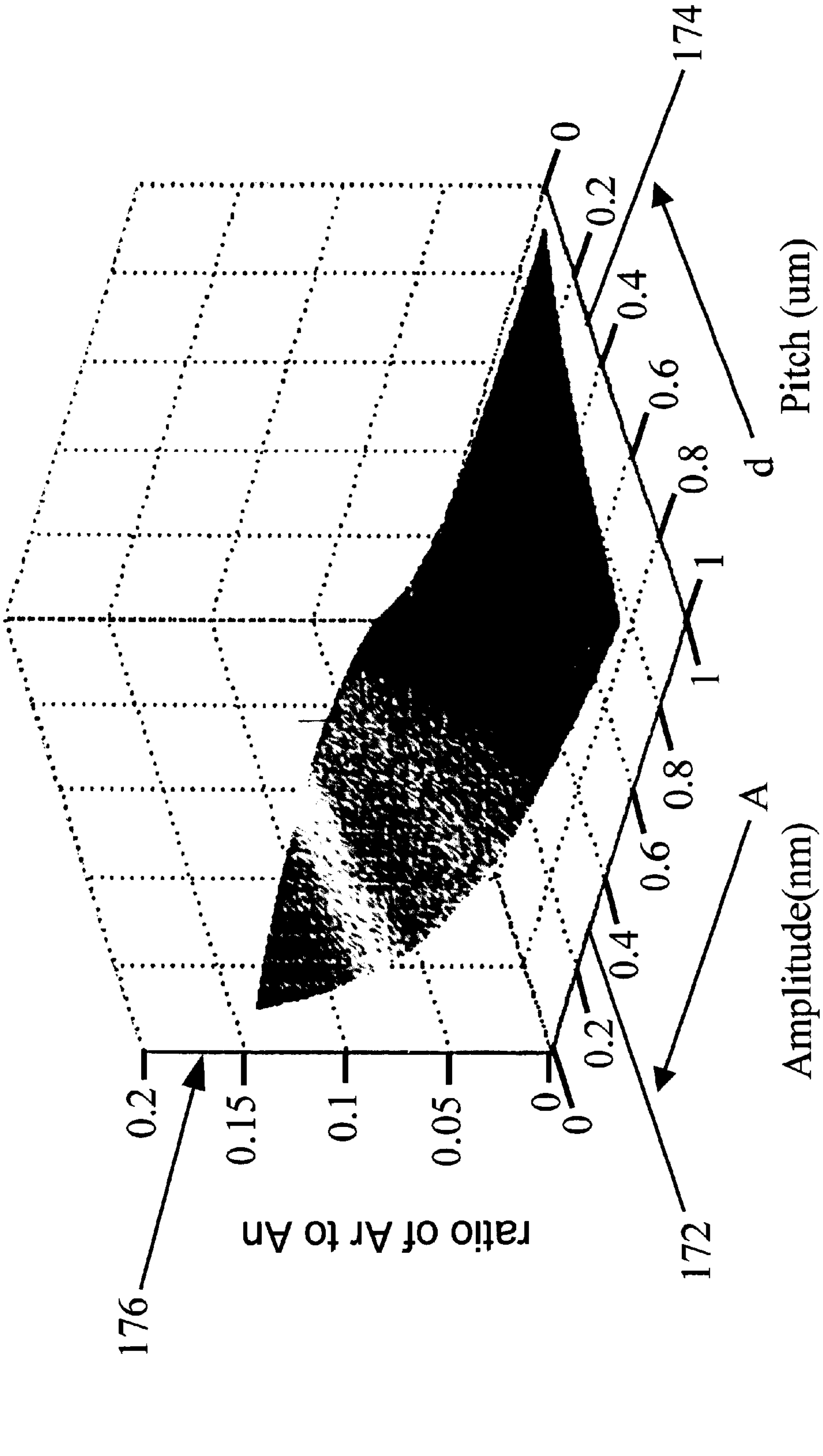
FIG. 13 is a graphical illustration of the relationship of amplitude and pitch parameters of a roughness structure to the contact area for stress distribution.

FIG. 12 illustrates variation of R for various pitches d and a set amplitude A or σ. As illustrated for σ=5 Å, R varies with the pitch dimension d. As shown, the plasticity index Ψ decreases as R and pitch d increase but contact stress is distributed over a larger area as R increases. The number of asperities is approximated by $\eta \approx 1/d^2$. FIG. 13 illustrates a graphical relationships of amplitude A 172 and pitch d 174 of projections and contact area 176 for optimizing stress distribution for a stiction control surface.

Figure 2:
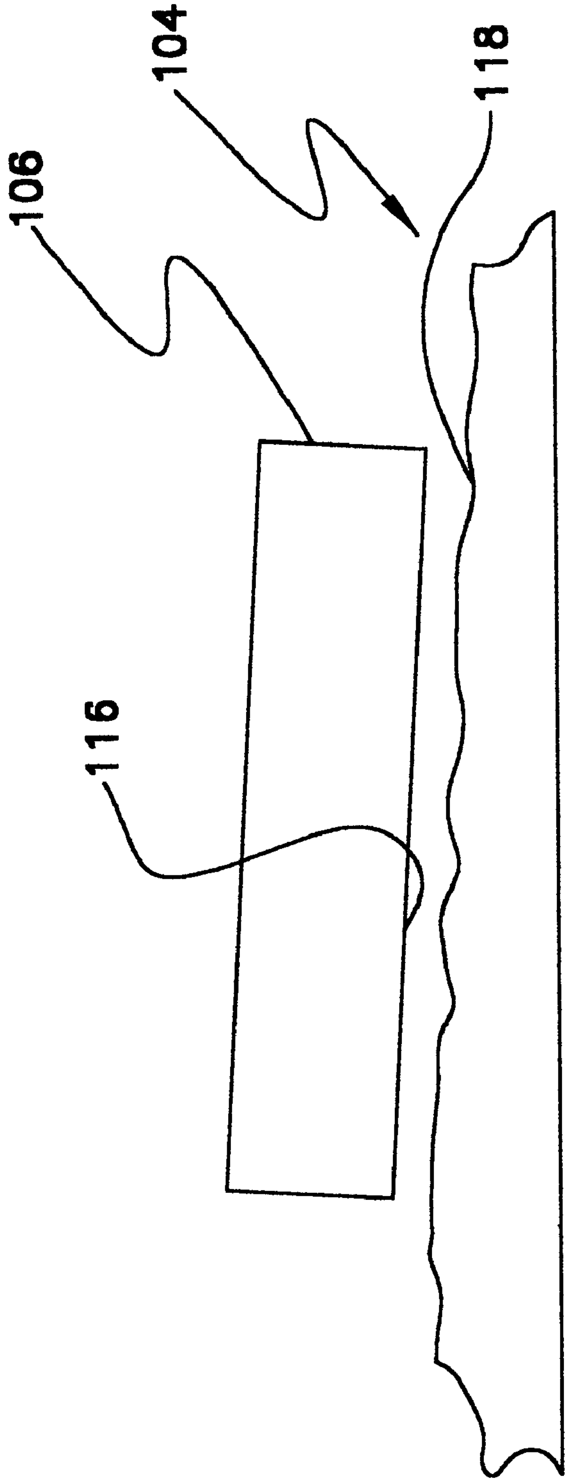
FIG. 2 is a schematic illustration of a head-disc interface.

FIGS. 14-1 through 14-7. illustrate various deterministic projection topographies. FIG. 14-1 illustrates sinusoidal projections 180. FIG. 14-2 illustrates thin curved projections 182. FIG. 14-3 illustrates thick curved projections 184. FIG. 14-4 illustrates square projections 186, FIG. 14-5 illustrates square domed projections 188, FIG. 14-6 illustrates square volcano projections 192 having a recessed well 194 for debris collection and FIG. 14-7 illustrates trapezoidal projections 196. Although various projection shapes are shown, application is not limited to the specific shapes shown.

Figure 15:
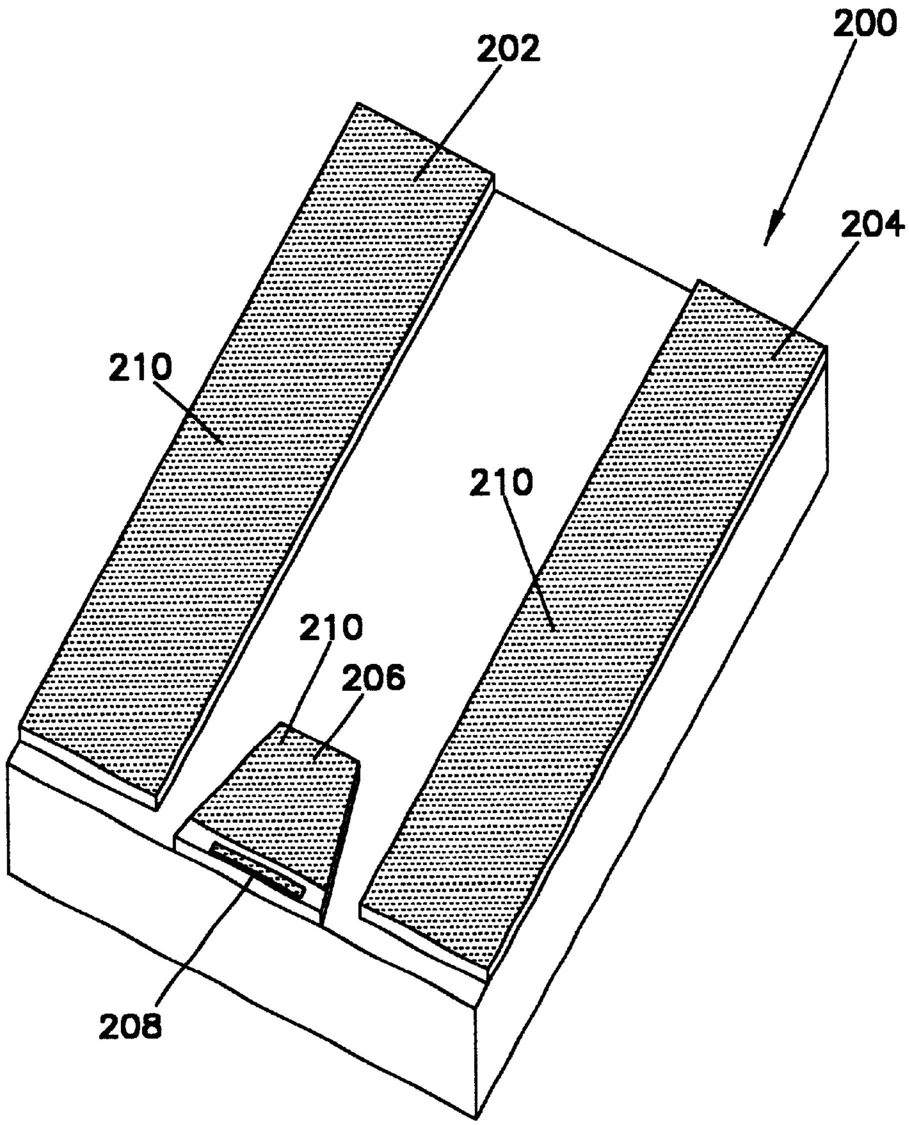
FIGS. 15–21 illustrate embodiments of head sliders including a fine pitch roughened surface having a relatively low roughness height.

As previously explained, the fine pitch roughness structure 140 having a relatively low projection height can be fabricated on head-disc interface surfaces. FIGS. 15–21 illustrate embodiments of fine pitch roughness structure 140 formed on interface surfaces of the head or slider having a leading edge and trailing edge supporting transducer elements. FIG. 15 illustrates a slider 200 including an air bearing surface having opposed side rails 202, 204 and a trailing end center bearing pad 206. Transducer element 208, illustrated diagrammatically, is formed proximate center bearing pad 206. As illustrated diagrammatically, a fine pitch roughened surface texture 210, having a relatively low projection or roughness height is formed on the upper surface of side rails 202, 204 and center bearing pad 206 to provide a tribological interface surface as described.

Figure 16:
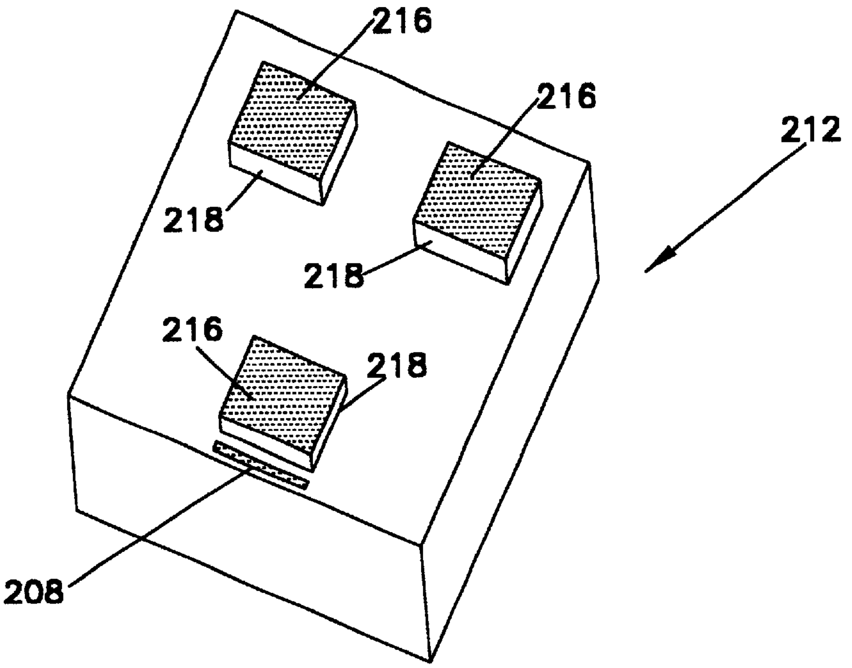
Figure 17:
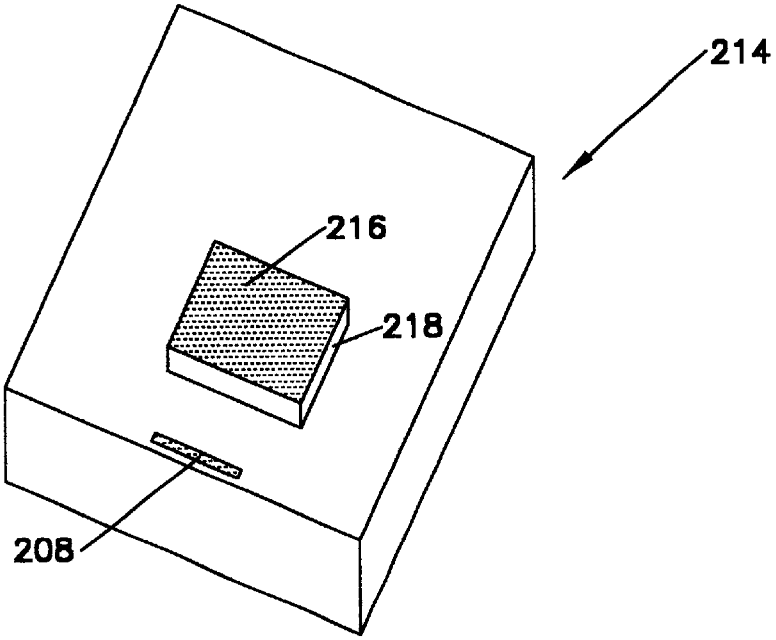
Figure 18:
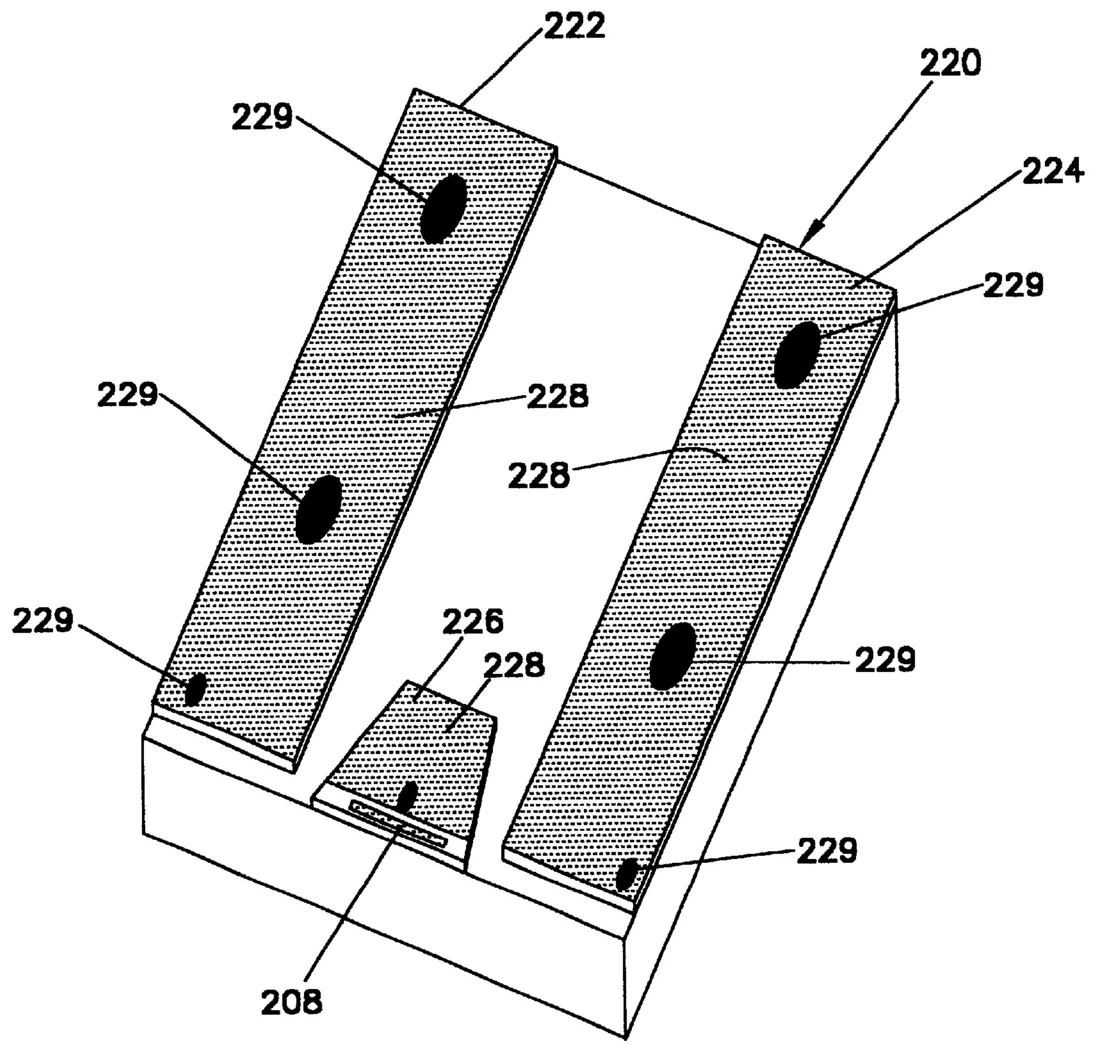

FIGS. 16 and 17 illustrate alternate slider embodiments 212, 214 having a fine pitch roughened texture 216 having a relatively low projection or roughness height on a sacrifical contact pads 218 for contact or near contact recording. FIG. 18 illustrates an alternate embodiment of a slider 220 including side rails 222, 224 and a trailing end center bearing pad 226. Slider 220 is similar to slider 200 of FIG. 15 and includes a fine pitch roughened surface texture 228 having a relatively low projection height on side rails 222, 224 and trailing end center bearing pad 226. Also slider 220 includes pads 229, formed of a diamond-like carbon, or other similar hard material, on the air bearing surface of the slider 220 for CSS. Although a particular pattern of pads 229 is shown, application is not limited to the particular pattern shown. Pads 229 or other interface surfaces, can also include roughened surface texture 228.

Figure 19:
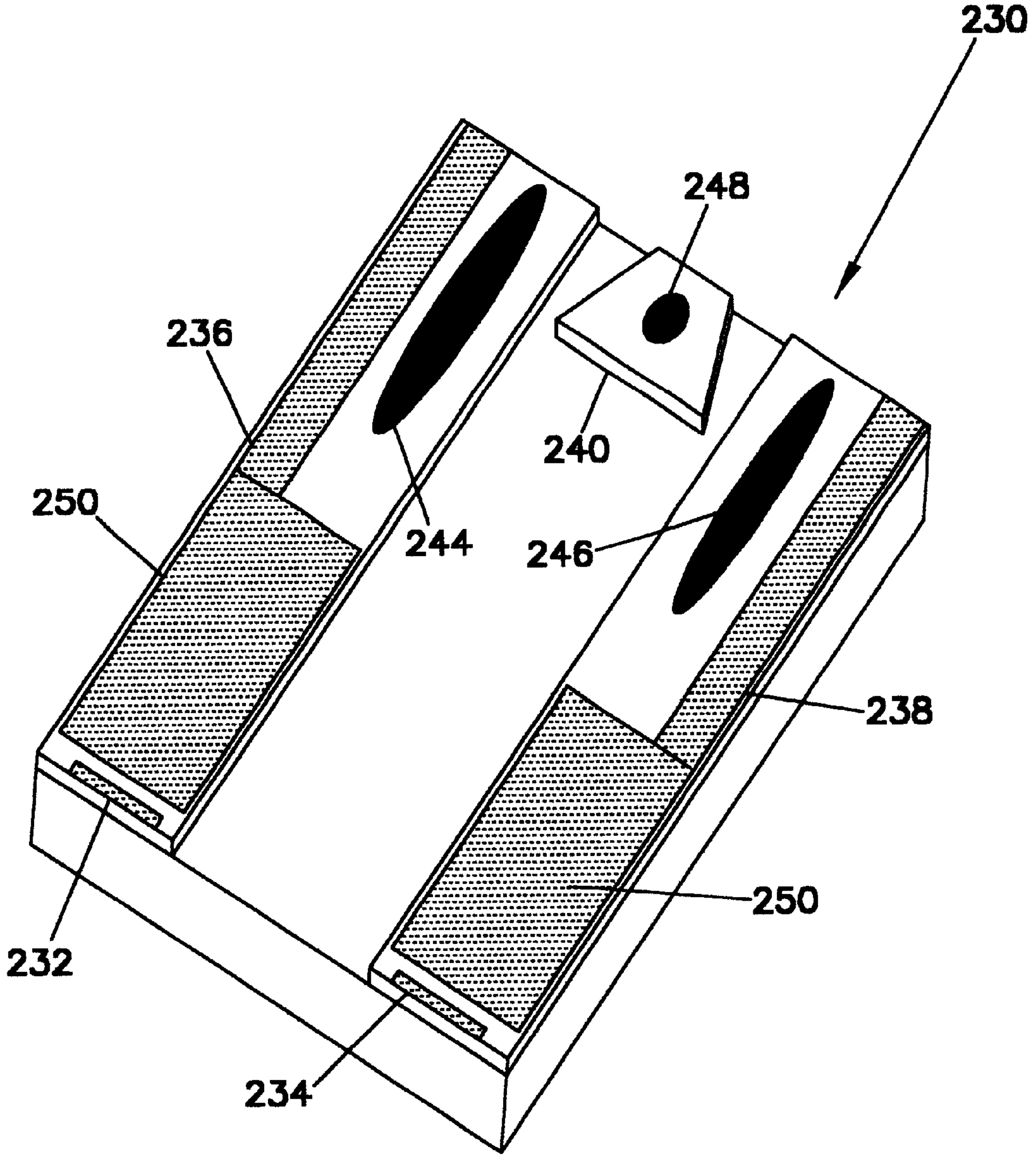
Figure 20:
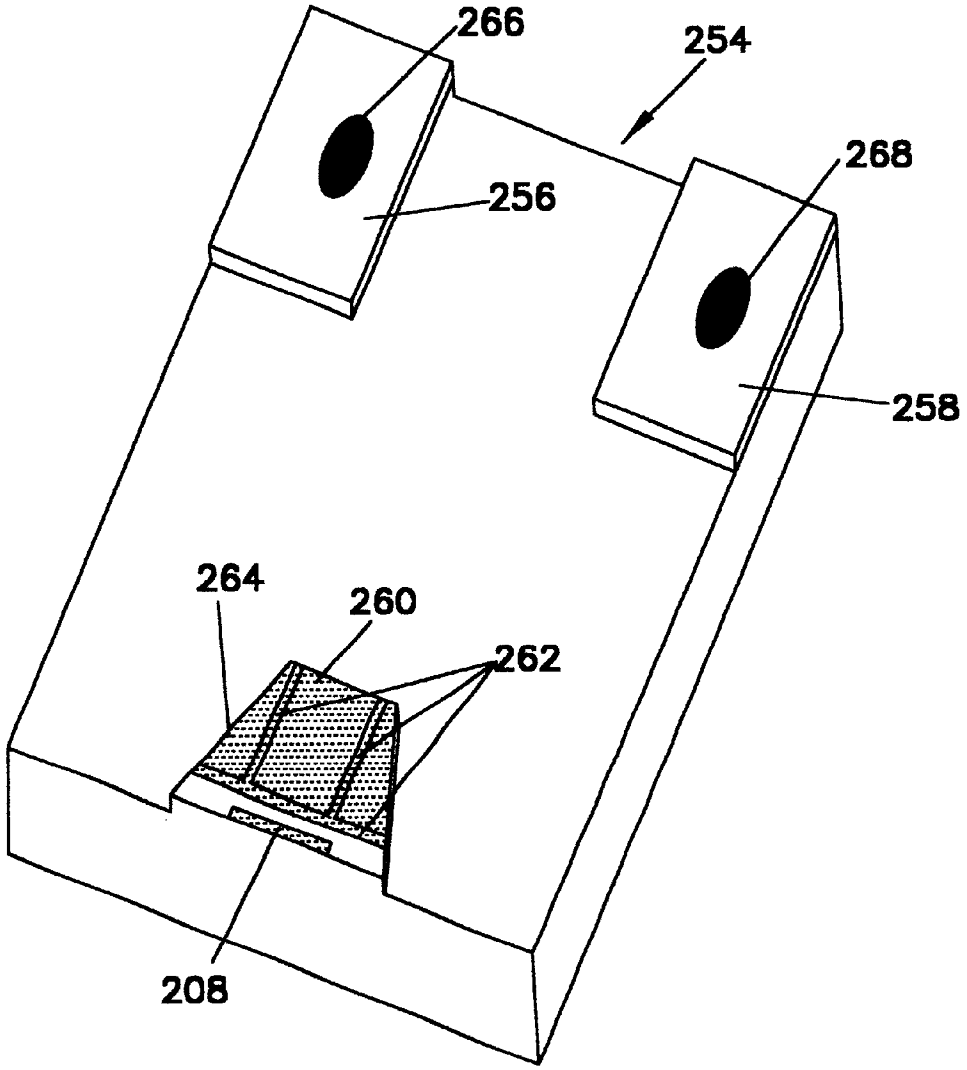

FIG. 19 illustrates another slider embodiment 230 supporting transducer elements 232, 234 which includes side rails 236, 238 and a leading end center bearing pad 240. Rails 236, 238 and center bearing pad 240 include landing or contact pads 244, 246, 248, respectively. Portions of rails 236, 238 surrounding landing pads 244, 246 include a fine pitch roughened texture 250 having a relatively low projection height for contact interface. In FIG. 20, slider embodiment 254 includes shortened leading end side rails 256, 258 and a trailing end center bearing pad 260 supporting transducer 208. Center bearing pad 260 includes trenches. 262 for meniscus control, and a fine pitch roughened surface texture 264 having a relatively low projection height. Rails 256, 258 including landing pads 266, 268.

Figure 21:
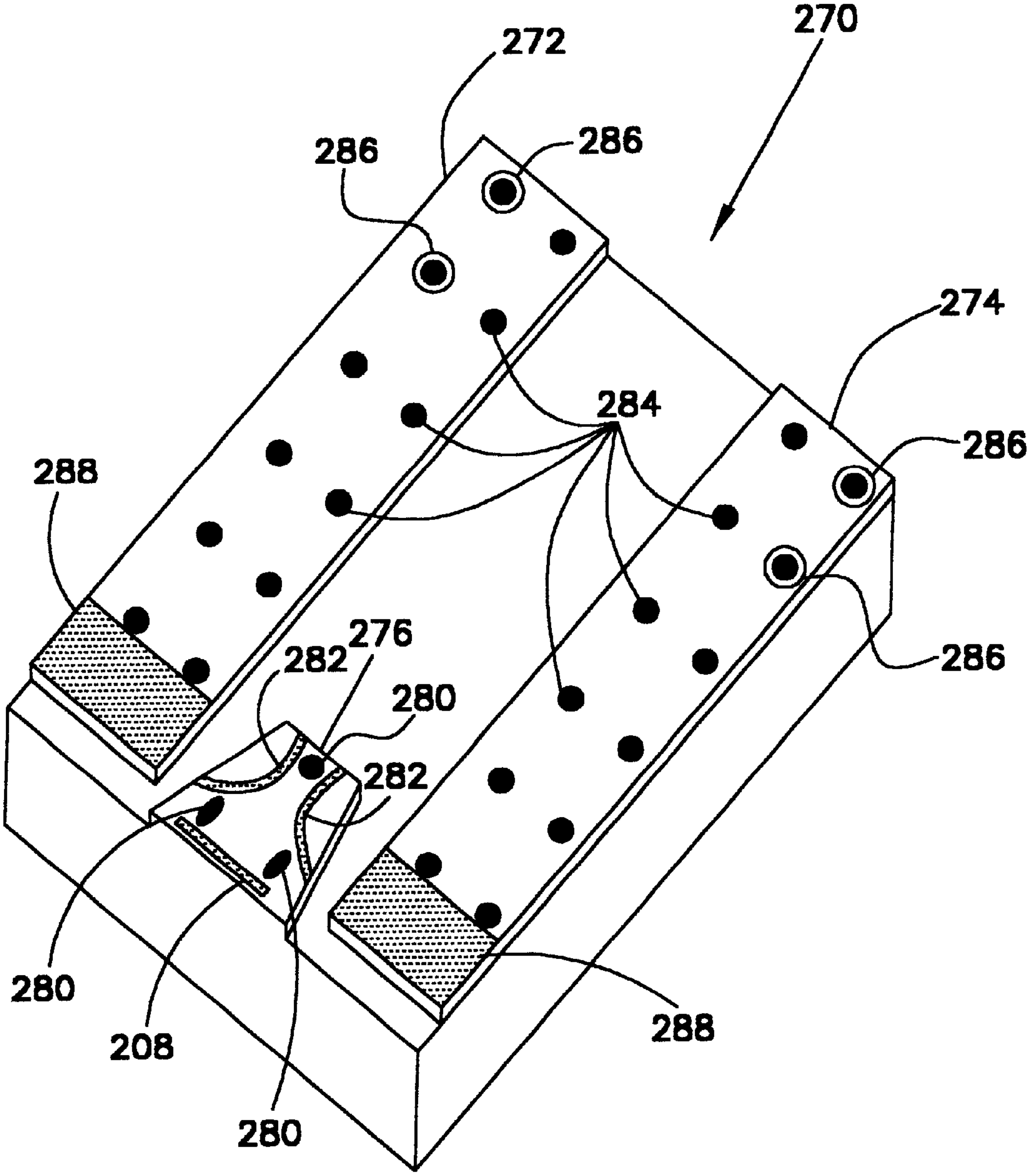

FIG. 21 illustrates an alternate slider embodiment 270 including side rails 272, 274 and trailing end center bearing pad 276. Transducer elements 208 are supported proximate to the center bearing pad 276 at the trailing edge of the slider 270. Center pad 276 includes contact pads 280 and trenches 282 for friction and stiction control. Rails 272, 274 include pads 284, some or all of which include moats 286 for meniscus and stiction control. Pads 284 reduce the contact interface area and moats 286 collect lubricant around pads 284 to reduce meniscus or stiction effects. A trailing end portion of rails 272, 274 includes a fine pitch roughened surface texture 288 having a relatively low projecting height for stiction and friction control. Although a trailing end portion includes fine pitch roughened surface texture 288, other interface surfaces of the air bearing can include a fine pitch roughened surface texture and application is not limited to the specific embodiment shown.

Figure 22:
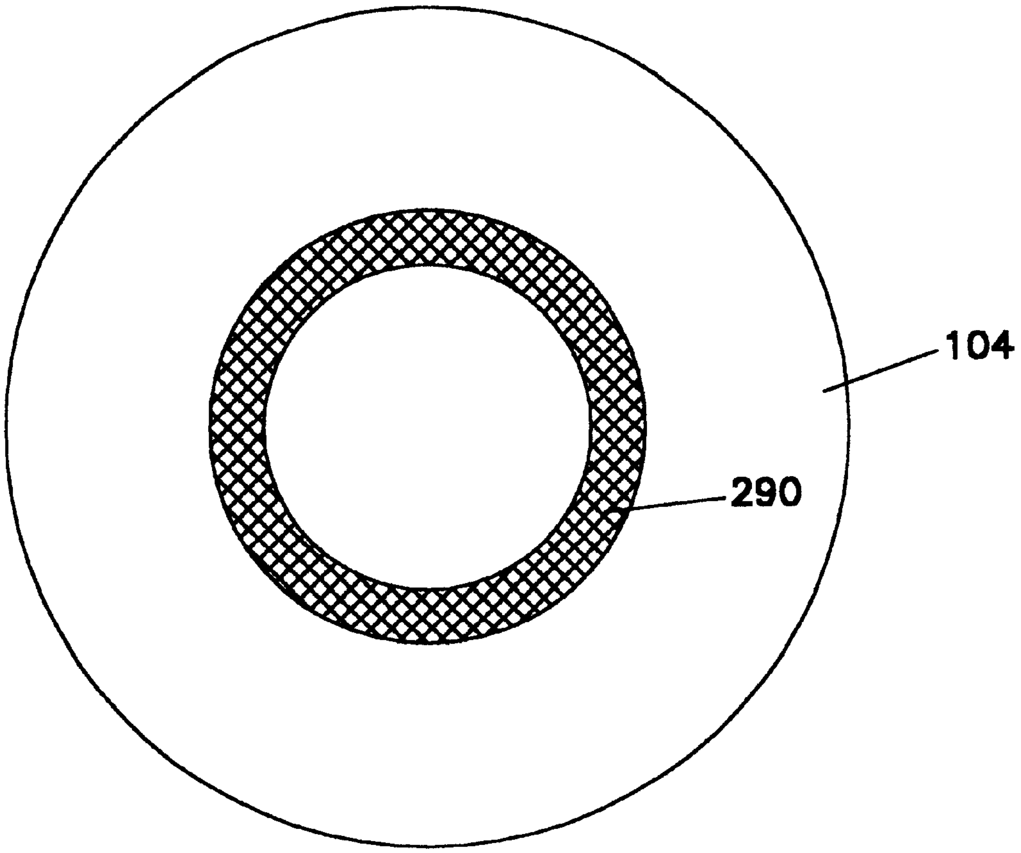
FIG. 22 illustrates a disc media including a fine pitch roughened surface having a relatively low roughness height.

FIG. 22 illustrates an embodiment of a disc 104 having an interface surface including a fine pitch texture 290 having a relatively low projection height as illustrated diagrammatically. In the embodiment shown, the textured surface 290 is formed on a landing zone proximate to the inner diameter of the disc 104. Although a particular embodiment is shown, application is not limited to the particular embodiment shown.

Although the present invention has been described with reference to preferred embodiments, workers skilled in the art will recognize that changes may be made in form and detail without departing from the spirit and scope of the invention.

What is claimed is:

1. A head-disc interface for digital recording comprising:

a data head including a transducer element; and at least one head disc interface surface having a fine pitch surface roughness including fine pitch projections having a relatively smooth roughness height having a roughness average $R_a$ of approximately 1.0 nm or less, a projection pitch d of approximately <1.0 μm and a ratio of σ/R greater than or equal to approximately $1.0\times10^{-5}$ where σ is a root mean square of the heights of the projections and R is an average value of a radius of curvature of projection summits which is a function of the projection height and the projection pitch.

2. The head-disc interface of claim 1 wherein the at least one head-disc interface surface is an interface surface of the data head.

3. The head-disc interface of claim 2 wherein the at least one head-disc interface surface is on a portion of an air bearing surface of the data head.

4. The head-disc interface of claim 1 wherein the at least one head-disc interface surface is on a portion of a surface of a disc.

5. The head-disc interface of claim 1 wherein the $R_a$ of the fine pitch surface roughness is approximately $R_a$=0.1–0.5 nm.

6. The head-disc interface of claim 1 wherein the projection pitch d is approximately d=0.1–0.8 μm.

7. The head-disc interface of claim 1 wherein the ratio of σ/R is an order magnitude larger than the σ/R ratio for a smooth surface structure having the same roughness height.

8. The head-disc interface of claim 1 wherein the roughness height and the pitch of the projections are derived based upon a calculation of a plasticity index Ψ where $$\psi = \frac{E}{H}\left[\frac{\sigma}{R}\right]^{1/2}$$

to maximize plastic deformation for a roughened surface structure having the relatively smooth roughness height.

9. The head-disc interface of claim 1 wherein the roughness height and the pitch of the projections are derived based upon a calculation of an adhesion index θ where $$\theta = E^{\sigma}_{\Delta\gamma}\left(\frac{\sigma}{R}\right)^{1/2}$$

to optimize adhesion for a roughened surface structure having the relatively smooth roughness height.

10. The head-disc interface of claim 1 wherein parameters for the fine pitch surface roughness are derived based upon the σ, the R and the ratio σ/R to optimize the projection height for head-disc spacing, to optimize the R for stress distribution and to optimize the ratio σ/R for stiction control.

11. The head-disc interface of claim 1 wherein the fine pitch surface roughness includes a sinusoidal pattern of projections.

12. The head-disc interface of claim 11 wherein A is an amplitude of the projections and $$\sigma \approx \sqrt{2A}$$

$$R \approx \frac{d^2}{4\pi^3 A}$$

and the pitch d and the amplitude A of the projections are derived based upon the σ, the R, and the ratio σ/R to optimize the σ for head-disc spacing, to optimize the R for stress distribution and to optimize the ratio σ/R for stiction control.

13. A data head supporting a transducer for read or write operations comprising:

a slider, including at least one transducer supported by the slider; and the slider including means for head-disc contact interface having a surface roughness characterized by fine pitch projections having a projection pitch d of approximately <1.0 μm, a relatively smooth roughness height having a roughness average $R_a$ of approximately 1.0 nm or less and having a ratio σ/R greater than or equal to approximately $1.0\times10^{-5}$ where σ is a root mean square of the heights of the projections and R is an average value of a radius of curvature of projection summits.

14. The data head of claim 13 wherein the surface roughness is formed on a portion of an air bearing surface of the slider.

15. The data head of claim 13 wherein the roughness average $R_a$ of the fine pitch projections is approximately 0.1–0.5 nm and the pitch d is approximately 0.1–0.8 μm.

16. A head-disc interface for digital recording comprising:

a data head including a transducer element; and at least one head disc interface surface having a fine pitch surface roughness including fine pitch projections having a relatively smooth roughness height having a roughness average $R_a$ of approximately 1.0 nm or less and projection pitch of approximately d<1.0 μm, the fine pitch surface roughness characterized by a ratio σ/R greater than or equal to approximately $1.0\times10^{-5}$ where σ is a root mean square of the heights of the projections and R is an average value of a radius of curvature of projection summits and the fine pitch surface roughness is formed using interference lithography.

* * * * *